(No Model.)

G. W. WALLIS.
HOSE COUPLING RESHAPER.

No. 601,689.  Patented Apr. 5, 1898.

WITNESSES:
Geo. A. McAndress
Jas. Smith

George W. Wallis INVENTOR

BY
ATTORNEY

UNITED STATES PATENT OFFICE.

GEORGE W. WALLIS, OF SAGINAW, MICHIGAN.

HOSE-COUPLING RESHAPER.

SPECIFICATION forming part of Letters Patent No. 601,689, dated April 5, 1898.

Application filed August 9, 1897. Serial No. 647,650. (No model.)

*To all whom it may concern:*

Be it known that I, GEORGE W. WALLIS, a citizen of the United States, residing at Saginaw, in the county of Saginaw and State of Michigan, have invented a certain new and useful Hose-Coupling Reshaper; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to re-forming machines for bent or misshaped hose-couplings and by means of which the misshaped portion is readily made true and perfect.

I am aware that other devices have been made for the like purpose, some of which have special relation to the screw-nut and some to the male-screw portion of the coupling. My device possesses features not covered by these devices, such as truing up the tailpieces on the end of the hose at the same time the coupling is re-formed and the retapping of the thread of the coupling, besides possessing other novel features of construction and arrangement whereby the device is more simple, more easily constructed and readily applied, and adapted to be used during a fire, even when a damaged coupling, if not immediately repaired, would render a large section of hose perhaps useless to the company and delay, if not making impossible, the control of the fire.

Figure 1:
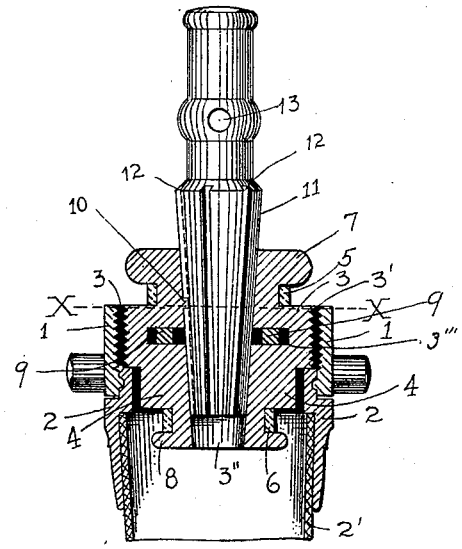
Figure 2:
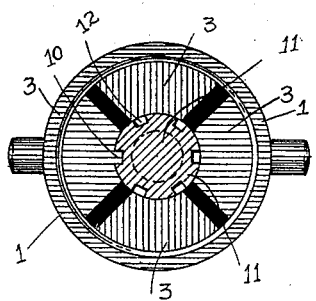

Figure 1 a vertical section of the reshaper. Fig. 2 is a horizontal section on the line $x$ $x$ of Fig. 1.

In the drawings, 1 is the screw-nut, or, as it is commonly called, the "female" section, of the coupling, and is swiveled to the tailpiece 2, attached to the hose 2'.

3 is the re-former, and consists of four or more sections exactly alike and when put together as shown forming a cylindrical-shaped body having a central core 3'', which is tapering or conical in shape, the smaller end being at the bottom or inside end when in use, as shown. These sections 3 have a portion of their outer surface 3' screw-threaded, so as to engage the threaded portion of the nut 1, the portion of the sections threaded being of the same depth as the threaded portion of the coupling.

The rubber bands 5 and 6, fitting within the collars 7 and 8 at each end of the sections, hold the sections together and permit the sections to be expanded or forced apart, as shown in Fig. 2, by a body entering the core 3'' and to be held in the same relative position. For the purpose of holding these sections in transverse alinement so that their threaded surfaces will match I form on the inside of each section a groove 3''', forming, when the sections are placed together, an annular groove, and into this groove I place the broad ring 9, which is of such width that when the sections are forced apart the required distance it will still remain in the groove and hold the parts in the same plane. Below the threaded portion 3' of these sections I form on an offset a smooth surface 4, adapted to engage the inner surface of the tailpiece 2.

11 is a mandrel having a conical portion adapted to pass within the conical core 3'', its base being larger than the core, whereby the sections will be forced apart, as shown in Fig. 2, and against the coupling 1 and tailpiece 2, the threads 3' engaging the threads of the coupling. It will be seen that as the mandrel is forced into the core, which is done by hammering upon its upper end, the pressure upon the walls of coupling will be uniform, and that if any part thereof is untrue or misshaped it will be forced into shape as the mandrel is forced down, and that if the tailpiece is bent it, too, will be re-formed.

Occasionally the threads on the coupling will get injured and broken or cut out, so that it is impossible to insert the opposite section of the coupling without retapping the coupling. This I do with my device, viz: 10 is a lug on one or more of the sections adapted to enage one of the grooves 12 I form on the conical surface of the mandrel. By passing a lever through the hole 13 in the handle of the mandrel I am enabled to turn the re-former in the coupling, which, being of soft metal and the re-former of hard metal, the threads of the latter will cut out the threads of the former, and, if necessary, new threads can be cut therein by forcing the mandrel farther into the re-former and turning it, as will be readily seen.

It is apparent that the means for holding the sections in alinement and for turning the re-former in the coupling may be varied, and therefore I claim, broadly, any means for accomplishing that end.

Having thus described my invention, what I claim as new, and desire to secure by Letters Patent, is—

1. A re-former for the nut-sections of hose-couplings, comprising a cylinder made of four or more duplicate sections held together by rubber bands fitting recesses in each end thereof, the sections held in alinement by a central ring fitting into a groove in each section, in line, a screw-threaded portion and a smooth portion on the outer surface of the sections adapted to engage the threaded portion of the coupling and the inner surface of the tailpiece respectively, a central tapering core in the cylinder so constructed, and a mandrel having a conical portion adapted to pass into the tapering core of the cylinder and expand the same by forcing the sections apart and against the wall of the coupling and tailpiece, as and for the purpose set forth.

2. In a hose-coupling reshaper comprising a cylinder made up of sections, and means for expanding the same, the means for holding the sections thereof in transverse alinement comprising a horizontal groove in each section, in line and on the inside thereof, and a ring adapted to fit the groove in each section and thereby hold the sections in transverse alinement, as specified.

In testimony whereof I hereunto affix my signature in the presence of two witnesses.

GEORGE W. WALLIS.

Witnesses:
JAS. SMITH,
A. BENSON.